United States Patent [19]

Turnbull

[11] Patent Number: 4,806,763
[45] Date of Patent: Feb. 21, 1989

[54] INFRARED RADIATION DETECTION DEVICE

[75] Inventor: Andrew A. Turnbull, Reigate, England

[73] Assignee: U.S. Philips Corp., New York, N.Y.

[21] Appl. No.: 115,329

[22] Filed: Nov. 2, 1987

[30] Foreign Application Priority Data

Nov. 12, 1986 [GB] United Kingdom ............... 8626969

[51] Int. Cl.$^4$ .............................................. G01J 5/20
[52] U.S. Cl. .................................................. 250/338.3
[58] Field of Search ............. 250/338 PY, 338 R, 342, 250/349

[56] References Cited

U.S. PATENT DOCUMENTS 4,704,534  11/1987  Turnbull ...................... 250/338 PY

FOREIGN PATENT DOCUMENTS 0050332  4/1982  European Pat. Off. .
0131231  1/1985  European Pat. Off. .
0174838  3/1986  European Pat. Off. .
0181538  5/1986  European Pat. Off. .
1580403  12/1980  United Kingdom .
2173038  10/1986  United Kingdom .

Primary Examiner—Carolyn E. Fields
Attorney, Agent, or Firm—William L. Botjer

[57] ABSTRACT

An infrared radiation detection device uses a pyroelectric polymer film (10), such as a poled vinylidene fluoride copolymer film, on one surface of which, facing incoming radiation, a front electrically resistive electrode (20) is disposed and on the opposite surface of which a back electrode (21) is disposed. Radiation absorption characteristics of the device for a given wavelength range of interest, for example 5 to 15 μm, are optimized by giving the front electrode a high resistance per square value and forming the polymer film between the electrodes with an optical thickness substantially one quarter of a selected wavelength within the wavelength range at which wavelength radiation absorption at the front electrode is to be substantially a maximum. The back electrode preferably is reflective, having a low resistance per square. More detector elements may be provided defined by respective portions of a common polymer film.

9 Claims, 1 Drawing Sheet

INFRARED RADIATION DETECTION DEVICE

BACKGROUND OF THE INVENTION

This invention relates to an infrared radiation detection device for detecting radiation in a given wavelength range of the kind comprising a flexible thin film of polymer material having pyroelectric properties on opposite sides of which electrodes are disposed.

Pyroelectric infrared radiation detector devices are used in a variety of applications. Their characteristics make them particularly attractive for application in remote switching systems, intruder detection systems and in movement sensing generally. In such applications, the detector device responds to a moving object by detecting the flux change produced in passing through the device's field of view. In the case of the object being a person, the infrared radiation emitted by the moving person or body part is converted by the detection device into an electronic signal which can be used, for example, to actuate an alarm or to switch lights on and off.

In a known form of detector device suitable for intruder detection purposes, a pyroelectric polymer dielectric film is sandwiched between a pair of electrodes which collect electrical charges developed at the surfaces of the polymer film in response to a temperature change in the film resulting from incident infrared radiation. The device includes an FET for impedance matching purposes whose gate is coupled to one electrode and from whose source the detector output signal is obtained. The polymer film typically has a thickness of between 12 and 20 $\mu$m to provide small heat capacity, and quick responsiveness.

For use in an intruder detection system, it is desirable that the detector device be capable of sensing infrared detection in the approximate wavelength range 5 to 15 $\mu$m.

One problem associated with infrared radiation detector devices is ensuring sufficient absorption of incident radiation at these wavelengths. Pyroelectric materials suitable for detector devices often have relatively low absorption over at least part of the wavelength range with which they are intended to operate. Also, the thinner the pyroelectric material, the lower will be the overall absorption of the incident radiation by the material. Therefore, it has been customary to improve absorption characteristics of the detector device by techniques such as the provision of black absorber coatings, providing a substantially wavelength independent response. Such blackening may take the form of blackening of one of the device's electrodes. In order to enhance the sensitivity of the detector device for a particular radiation wavelength or wavelength range, a coating of selective radiation absorbing material may be applied providing the required filtering characteristic. Radiation of the wavelength range of interest is then absorbed in this coating and the heat produced conducted to the pyroelectric material. These spectrally selective absorption coatings are applied to the outer surface of one of the detector devices's electrodes.

The provision of such absorptive coatings complicates manufacture of the devices and, particularly with selective absorbers, are comparatively costly to produce.

It is an object of the present invention to provide an infrared radiation detection device which has selective wavelength response characteristics and which is simpler, and less costly, to produce.

SUMMARY OF THE INVENTION

According to the present invention, an infrared radiation detection device of the kind specified in the opening paragraph is characterised in that the electrode facing the incoming radiation (the front electrode) comprises a resistive layer having, in operation, a substantial effective resistance per square such that said layer absorbs a substantial proportion of incident radiation in said wavelength range, and in that the polymer film has an optical thickness which is substantially one quarter of a selected wavelength in said wavelength range at which wavelength it is desired that the absorption of incident radiation by the electrode facing the incoming radiation should be substantially a maximum.

Preferably the electrode on the opposite side of the polymer film (the back electrode) is substantially reflective for radiation in the said wavelength range, having a very low resistance per square value, so that any radiation in that range passing through the polymer film is reflected back towards the polymer film and the opposite, front, electrode. Alternatively however, this electrode may be a resistive layer, having an increased resistance per square value and less reflectivity, for absorbing radiation passing through the polymer film. This increased resistance per square of the back electrode is adapted in dependence on the refractive index of the polymer film substantially to optimise absorption of radiation. By way of example of such an alternative, the front and back electrodes may both have a resistance per square value of around 250 ohms but also could differ from one another in their resistance values.

The invention involves the recognition that the thin polymer dielectric film constituting the pyroelectric element of the detector device which usefully demonstrates in operation low thermal capacitance can also be used to considerable advantage as the thickness of a quarter-wavelength optical layer in combination with an electrically resistive layer associated with the pyroelectric element, for improving the absorption of incident infrared radiation.

Said selected wavelength may be such that the absorption of incident radiation by the device over the said wavelength range is substantially maximised.

By virtue of the polymer film being relatively thin, the device structure exhibits high capacitance which is particularly beneficial as it provides a better match to an FET typically used in conjunction with the device.

The invention is particularly applicable to detector devices responsive to infrared wavelengths in the wavelength ranges 5 to 15 $\mu$m, as, for example, would be the case where the device is to be used for the purpose of intruder detection or other applications which involve the detection of the characteristic infrared radiation associated with the human body or other objects close to room temperature. The selected wavelength in these circumstances may therefore be around 8 $\mu$m, so that the polymer film has an optical thickness (equal to its physical thickness times its refractive index) of approximately 2 $\mu$m.

If, with respect to the direction of incidence of infrared radiation to be detected the resistive layer of the front electrode is immediately preceded by free space, and the back electrode is substantially reflective, the resistive front electrode suitably has a resistance per square substantially equal to the characteristic impedance of free space, namely approximately 377 ohms per square, this resistance per square value being advantageous for substantially absorbing radiation in the desired operating wavelength range.

It may be noted that U.K. Patent Specification GB No. 2173038A which corresponds to U.S. Pat. No. 4,704,534 discloses an infrared detector device comprising a ceramic pyroelectric element of PLZT (Lanthanum doped lead titanate zirconate), with electrodes disposed on opposite sides of the element, and a selective radiation absorbing structure over the electrode facing incident radiation which structure consists of a resistive layer and a film whose optical thickness is chosen to be approximately one quarter of a selected wavelength substantially in the wavelength range with which the device is intended to operate. Because this device entails the provision of a number of additional layers together constituting the absorbing structure which have to be disposed over the pyroelectric element with its associated electrodes, it has a relatively complicated construction which can lead to manufacturing difficulties and render the device costly to produce. Additionally, the means used to improve absorption of radiation inevitably adds to the thermal capacitance of the detection device which can be undesirable. In contrast the detection device according to the present invention comprising a pyroelectric polymer film and in which the film itself is utilised as a quarter-wavelength optical element, has a considerably simplified structure, using significantly less layers, thereby facilitating manufacture and enabling production costs to be reduced. Moreover, in view of the fact that the use of additional layers constituting the absorber structure is avoided, complications regarding the thermal capacitances of the materials previously employed for these additional layers, and their effect on the devices performance are also avoided.

Although a number of different pyroelectric polymer materials may be used for the thin polymer film, in a preferred embodiment of the invention the pyroelectric polymer film comprises a vinylidene fluoride polymer. This may be a vinylidene fluoride homopolymer, copolymer or terpolymer, or a mixture or blend of such polymers. It has been found particularly preferable to use a vinylidene fluoride copolymer, for example a vinylidene fluoride copolymer including at least one other copolymerisable halogenated monomer such as trifluoroethylene, tetrafluoroethylene or vinylfluoride, as these have good pyroelectric properties and are considered better so far as their workability is concerned.

Examples of the above materials are widely available commercially from a variety of manufacturers including Solvay, Pennwalt Corporation, Raychem Corporation and Kureha. Details of such suitable pyroelectric polymers are to be found in a number of recent patent specifications including, for example, European Patent Specifications EP No. 0050332A, EP No. 0131231A, EP No. 0181538A, and EP No. 0174838A, whose disclosures in this respect are incorporated herein by reference.

Particularly good results have been achieved using a vinylidene fluoride trifluoroethylene copolymer. This material has n important advantage, so far as the present invention is concerned, over older types of pyroelectric polymers such as, for example polyvinylidene fluoride (PVDF) material. The latter material, which has found a limited use in the infrared radiation detector device field, needs to be both stretched and poled (sometimes referred to as polarising), in order to function satisfactorily as a pyroelectric element. The mechanical characteristics of this material are such that it is not well suited to forming very thin film thicknesses, for example in the order of 1.5 to 5 $\mu m$, and, whilst not impossible, difficulty may be experienced in producing such thin films from this material. The material has been used heretofore in detector devices in the form of a film having a typical thickness, after stretching, greater than 10 $\mu m$.

The copolymer vinylidene fluoride trifluoroethylene, however, does not require stretching, only poling, and can readily be formed into films having thicknesses as low as 1.5 $\mu m$ without difficulty.

A particular example of this material which has been used with success and found to provide very good results is a vinylidene fluoride trifluoroethylene copolymer obtained from Solvay et Cie of Belgium under their reference VF2/TrFE and containing 21 mol percent of trifluoroethylene.

BRIEF DESCRIPTION OF THE DRAWING

Embodiments of the invention will now be described, by way of example, with reference to the accompanying drawing, in which.

DETAILED DESCRIPTION OF THE INVENTION

Figure 1:
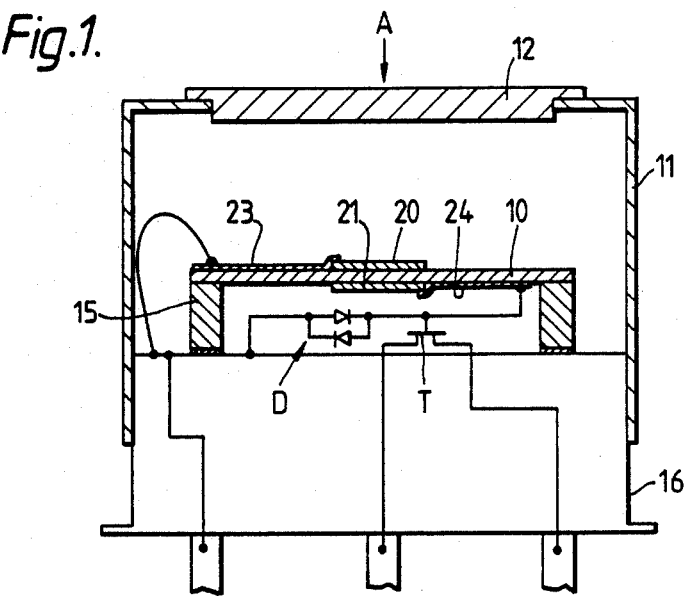
FIG. 1 shows schematically, and not to scale, a cross-section through a first embodiment of a detection device according to the invention.

Referring to FIG. 1, the infrared radiation detection device comprises a flexible thin film 10 of dielectric polymer material having pyroelectric properties mounted within a conventional TO-5 can 11 having a window 12 therein comprising a daylight filter, for example a germanium window, through which infrared radiation to be detected passes. The pyroelectric element 10 is of circular form and is held taut, but not stretched, by means of a correspondingly-sized electrically insulative annulus 15 to which it is bonded around its periphery by epoxy adhesive. The annulus 15 is mounted on the header 16 of the can so that the area of the film 10 inwardly of its periphery is supported spaced from the header. The annulus 15 is preferably made of a material having a coefficient of thermal expansion near to that of the film 10, and may be of, for example, polyvinylidene fluoride. The pyroelectric thin film 10 consists of a vinylidene fluoride trifluoroethylene copolymer material obtained from Solvay under their reference VF2/TrFE which has been poled in a conventional manner to orient appropriately its dipoles in order that it exhibits satisfactory pyroelectric properties. Other polymer materials exhibiting pyroelectric properties, for example, polyvinylidene fluoride material, may be used instead to form the film 10, as previously discussed.

The device is adapted for infrared radiation that is to be detected to be incident in the direction of the arrow A, the window 12 allowing substantially all the incident radiation in the intended operating wavelength range of the device to pass therethrough. When the temperature of the pyroelectric film 10 changes locally owing to the absorption of thermal energy from incident radiation, charges are developed at opposed faces of the affected regions of the film 10, namely the upper and lower surfaces respectively as shown in the drawing. These surfaces are provided with respective electrodes 20 and 21 overlying and substantially co-extensive with one another, which serve to define the actual detector element. The electrodes 20 and 21 are supported solely by the film 10 and are located away from the peripheral edge of the film. Since charge generation within the pyroelectric film 10 is dependent on temperature changes of the film, incident radiation must vary with time in order that it is detected. This may inherently be the case where the detection device is to respond to changes in an otherwise substantially unchanging environment as for example for intruder detection purposes. Alternatively it may be achieved by scanning the device across a scene being viewed or by chopping the incident radiation.

The pyroelectric film 10 may be poled completely thereover, or alternatively, and as is the case with this embodiment, may be poled only at that portion of the film located between the electrodes 20 and 21, the electrodes being used for poling purposes to this end in a known manner.

Since the pyroelectric film 10, being thin, may generally absorb relatively little of the incident radiation over at least part of the operating wavelength range, it is desirable that radiation absorption be increased in order to improve the device's sensitivity. This is achieved by giving the electrode 20 a suitable resistance per square substantially to absorb radiation and by selecting the thickness of the film 10 to reduce reflection of incident radiation. Reflection is a minimum at wavelengths for which the optical thickness of the film, i.e. the product of its physical thickness and its refractive index, is an odd number of quarter wavelengths and is a maximum at wavelengths for which the optical thickness is an even number of quarter wavelengths. The greatest bandwidth over which reflection is reduced is obtained by making the optical thickness substantially one quarter of a selected wavelength. This wavelength is suitably selected bearing in mind that reflection increases fairly rapidly to a maximum as the wavelength of the incident radiation decreases from the selected value to half the selected value but increases much less rapidly as the wavelength increases from the selected value, and taking into account the spectral absorption characteristics of the material of the film 10 and, to some extent, the window 12. The selected wavelength is chosen such that the absorption of incident radiation by the device over the wavelength range of interest is substantially maximised.

The detector device is intended to be used for detecting infrared radiation characteristic of a human body, for example being for use in an intruder detection system, and accordingly the wavelength range of interest is chosen to be approximately 5 to 15 $\mu$m. It is desired to maximise absorption of radiation by the resistive electrode layer 20 at a wavelength of 8 $\mu$m and so the optical thickness of the film 10, at least at the region thereof between the electrodes 20 and 21, is selected to be substantially one quarter of this wavelength, approximately 2 $\mu$m. The thin film 10 is readily formed to the required physical thickness value by a casting technique in a known manner.

The electrode layer 20 comprises nickel/chromium alloy and is disposed directly on the respective surface of the film 10 by sputtering or evaporation to a thickness of less than 0.1 $\mu$m. The electrode layer 20 has a substantial effective resistance per square so as to ensure the layer absorbs a substantial proportion of incident radiation in the wavelength range of interest. The electrode layer 20, which is immediately preceded by free space and faces the window 12, is chosen to have a resistance per square value of approximately 377 ohms, this being the characteristic impedance of free space, to optimise absorption of radiation. The electrode layer 21, facing the header 16, is made reflective so as to reflect substantially any radiation in the wavelength range of interest passing through the film 10 back towards the electrode layer 20. The electrode layer 21 is disposed directly on the film 10 and comprises a nickel/chromium "seed" layer coated with a gold layer both of which layers are formed by vacuum-deposition. It is considered that for the reflecting electrode layer 21, a resistance per square adjacent the film 10 of the order of 5 ohms or less should be adequately low.

It can be demonstrated mathematically that the absorption of incident infra red radiation by the three layer structure 20, 10, 21 is dependent on, among other things, the optical thickness of the film 10 and the resistances of the electrodes 20 and 21 and shows that high absorption by the structure over the wavelength range of interest may be achieved by making the optical thickness of the film 10 to be equal to a quarter of a particular wavelength, by making the resistance of the electrode approximately 377 ohms per square and by making the resistance of the electrode 21 very low, and thus reflective. The absorption for each wavelength in the range varies slightly but, taking the wavelength range as a whole, optimised absorption is obtained. Comparatively good absorption characteristics can still be achieved with the back electrode 21 being more resistive, and with the front electrode having a different resistance per square value. For example, if both the front and back electrodes have a resistance per square value of around 250 ohms, useful absorption characteristics can still be obtained.

Electrical connection with the electrode layers 20 and 21 is established by forming relatively narrow conductive tracks 23 and 24 on the respective surfaces of the element 10 which contact the electrode layers at their one end and, as shown, lead to terminals at their other end which are electrically connected to the header 16 and a field effect transistor T, located in the can 11, in a known manner. The FET is coupled in a circuit with the detector element constituted by the electrodes 20 and 21 and the portion of the film 10 therebetween which includes a non-linear network D that protects the gate of the FET, which forms part of an impedance matching circuit, from excessive voltages. A fuller description of this type of circuit is to be found in British Patent Specification No. 1580403.

The electrodes 20 and 21 may be square, for example of 0.5 mm side, defining a square shape pyroelectric detector element, or alternatively circular of similar dimensions.

In use, the above detector device has been found to have a very high absorption, approaching 100%, for the selected wavelength within the wavelength range of interest, rendering the device extremely sensitive to radiation in that range.

Figure 2:
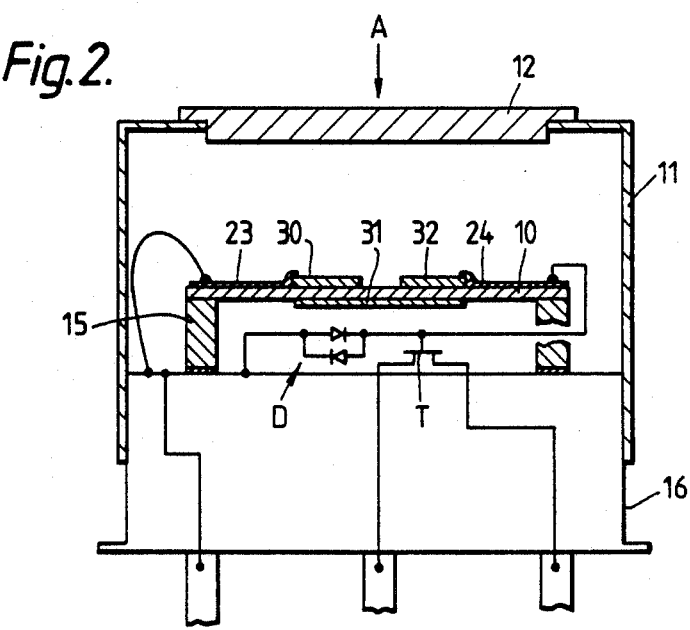
FIG. 2 shows schematically and again not to scale a cross-section through a second embodiment of a detection device according to the invention.

FIG. 2 shows a second embodiment of a device according to the invention. This embodiment takes the form of a so-called "dual" detection device. Components corresponding generally with those of the FIG. 1 embodiment are designated with the same reference numerals.

The detection device comprises two separately-operating detector elements constituted by respective and physically separate electrodes 30, 32, each similar to the electrode 20 in the FIG. 1 embodiment, respective portions of the pyroelectric copolymer thin film 10, and respective portions of a common electrode 31, similar to the electrode 21 of the FIG. 1 embodiment. Hence the electrode 30 together with the immediately underlying portions of the pyroelectric film 10 and electrode 31 constitute one detector element and the electrode 32 together with its immediately underlying portions of the pyroelectric film 10 and electrode 31 constitute the other detector element. It is seen therefore that the two detector elements are in effect defined by the two electrodes 30 and 32 respectively. The portions of the film 10 underlying the electrodes 30 and 32 are poled in the same direction. The film may be poled completely thereover or, alternatively, only at those portions. The materials and thicknesses of these detector element components are as previously described with regard to their counterparts in the FIG. 1 embodiment, electrodes 30 and 32 having a resistance per square of approximately 377 ohms, the electrode layer 31 being reflective, and the film 10 having, at least at the regions underlying the electrodes 30 and 32, an optical thickness equal to one quarter of a selected wavelength within the wavelength range of interest.

The principle involved can be extended if desired to produce detection devices having linear and two dimensional arrays of detector elements, the elements all being defined by respective electrodes and portions of a common pyroelectric film 10. In the particular embodiment of FIG. 2, the two detector elements are coupled in series, being interconnected through the common electrode layer 31. With the element portions of the pyroelectric film 10 polarised in the same direction, the polarities of the two detector elements connected in series are opposite. The electrodes 30 and 32 are connected in circuit containing an FET and non-linear network, as previously, through conductive tracks 23 and 24 carried on the film 10 and contacting the electrodes 30 and 32, the track 24 in this case being on the upper surface of the film like track 23. Because the two detector elements are connected differentially, and to a single FET, immunity is provided from common mode signals such as those generated by variations in ambient temperature, background radiation and acoustic noise as both elements respond equally and so generate equal and opposite signals which cancel to give no overall output signal. However, a moving source of infrared radiation provides an output signal if it is arranged that the two detector elements receive the radiation unequally, for example by using a focused optical system.

I claim:

1. An infrared radiation detection device for detecting radiation in a given wavelength range comprising a flexible film of polymer material having pyroelectric properties on opposite sides of which electrodes are disposed, characterised in that the electrode facing the incoming radiation comprises a resistive layer having, in operation, a substantial effective resistance per square such that said layer absorbs a substantial proportion of incident radiation in said wavelength range, and in that the polymer film has an optical thickness which is substantially one quarter of a selected wavelength in said wavelength range at which wavelength it is desired that the absorption of incident radiation by the electrode facing the incoming radiation should be substantially a maximum.

2. A detection device according to claim 1 characterised in that the electrode on the opposite side of the film is substantially reflective for radiation in said wavelength range.

3. A detection device according to claim 1 or claim 2, characterised in that the resistive layer is, in the direction of incoming radiation, immediately preceded by free space and has a resistance per square substantially equal to the characteristic impedance of free space.

4. A detection device according to polymer claim 1, characterised in that the pyroelectric polymer film comprises a vinylidene fluoride polymer.

5. A detection device according to claim 4, characterised in that the pyroelectric polymer film comprises a vinylidene fluoride copolymer.

6. A detection device according to claim 5, characterised in that the copolymer comprises a vinylidene fluoride trifluoroethylene copolymer.

7. A detection device according to claim 1, characterised in that said selected wavelength is such that the absorption of incident radiation by the device over said wavelength range is substantially maximised.

8. A detection device according to claim 1, characterised in that said detection device is responsive to radiation of a wavelength of approximately 5 to 15 μm.

9. A detection device according to claim 1, characterised in that the electrodes are supported solely by the polymer film and in that the polymer film is supported by means located away from the electrodes.

* * * * *